A. S. HOWELL.
CINEMATOGRAPH OR MOTION PICTURE FILM.
APPLICATION FILED FEB. 13, 1915.

1,267,411.

Patented May 28, 1918.

Witnesses:
Wm Harold Eickelman
A. B. Potts

Inventor:
Albert S. Howell
By Benjamin, Roadhouse & Lundy
attys.

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

CINEMATOGRAPH OR MOTION-PICTURE FILM.

1,267,411.     Specification of Letters Patent.     Patented May 28, 1918.

Application filed February 13, 1915. Serial No. 7,929.

*To all whom it may concern:*

Be it known that I, ALBERT S. HOWELL, a citizen of the United States, and a resident of Chicago, in the county of Cook and State of Illinois, have invented certain new and useful Improvements in Cinematograph or Motion-Picture Films, of which the following is a specification.

My invention relates to improvements in cinematograph or motion picture film containing a succession of chronologically successive views. The present practice in the making of cinematograph or motion picture film is to employ a strip of film approximately an inch and three-eighths wide, in the center of which are transversely disposed the separate pictures or views approximately seven-eighths of an inch long by three-fourths of an inch broad, which leaves a space upon each side of the view for a row of perforations, by means of which the film is moved to bring the views successively in position for projection. It is also the usual practice to dispose the perforations, which are a trifle longer than they are broad transversely with respect to the film and to provide four perforations adjacent each edge of each view, the center of the first and fourth perforation coming between adjacent views.

There are a great many uses for motion pictures, such as private exhibitions and commercial exhibitions where the successive operations of an industry are illustrated, where it is not desirable to enlarge the view to such an extent as is done in motion picture theaters, in which small views could be employed with equal efficiency.

My present invention has for its object the provision of a film which will effect a considerable saving in the amount of film necessary whether the picture be small or large, and which is peculiarly adapted to effect an economy of film in such cases as are suitable for the employment of a smaller view.

A further object is the disposition and construction of the film perforations in a manner so that the operating mechanism may be confined within a much smaller space than is now usually occupied thereby, and which will at the same time take care of any shrinkage or other variations that may, from time to time, occur in the film. Still another object of my invention is the provision of a film the perforations in which, when coöperating with the film actuating mechanism is held and moved in perfect register so as to dispense with the usual friction devices employed to exert pressure or tension upon and clamp the film, thereby avoiding any "back-pull" thereon or defective registry with the aperture.

These and other objects I prefer to accomplish by the means and in the manner hereinafter fully described and as more particularly pointed out in the claims, reference being had to the accompanying drawings, forming a part of this specification, in which:—

Figure 1:
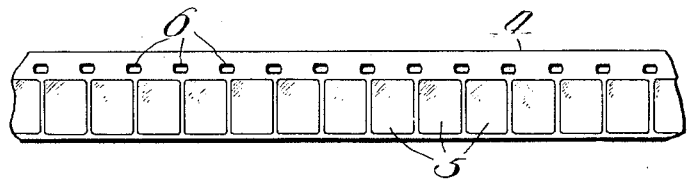
Figure 1 is a plan of a fragment of film, made in accordance with my present invention in which a single line of views of a reduced size is shown.

Similar reference characters refer to similar parts throughout the several views. Instead of employing a line of perforations upon each margin of a film I perforate but one margin of my film and whereas the present practice is to place the longest portion of the perforation transversely of the film, I have placed the longest axis of the perforations longitudinally on the film. This disposition is clearly shown in each of the three views in which the film is designated by the numeral 4, the views by the numeral 5, and the perforations by the numeral 6.

I also employ but one perforation for each view, there being in my film only perforations, the centers of which preferably aline with a medial line between adjacent views.

I find that a satisfactory view for the production of smaller pictures can be secured by making the same a quarter the size now employed.

Figure 2:
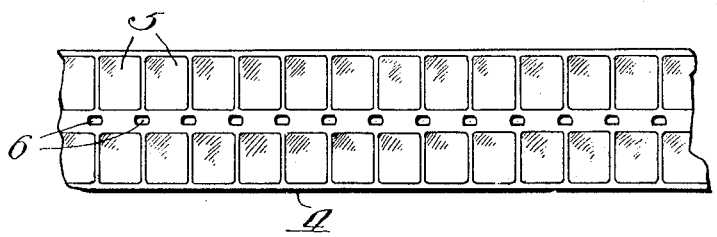
Fig. 2 is a plan of a fragment of film embodying my present invention in which a double line of views of reduced size is shown.

With the arrangement above described a film may be perforated in the middle, as shown in Fig. 2 and views may be produced thereon on both sides of the perforation, in which case I can secure four times the number of views on a film of the same length but of less width than they now employ.

By reason of disposing the perforations with their longer diameters or meridians longitudinally with the film I can control the path of the film by means of these perforations.

Figure 3:
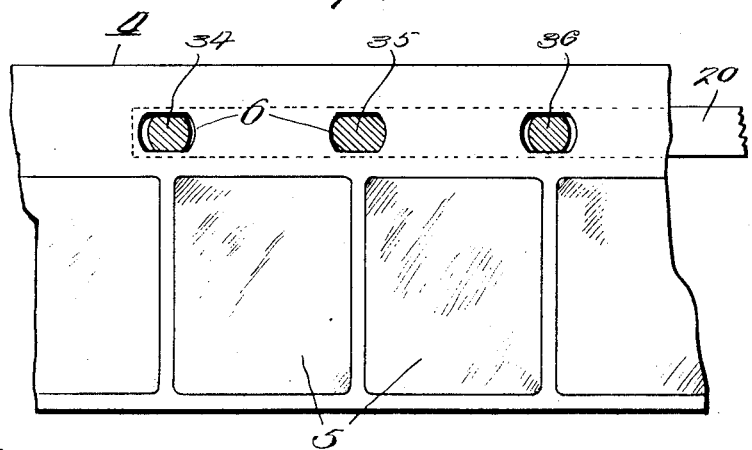
Fig. 3 is a plan of a fragment of film, made in accordance with my invention having a single line of views, the figure being somewhat exaggerated to more clearly disclose the features thereof.

The actuating mechanism for the purpose of imparting to the film an intermittent motion in front of the usual aperture, comprises a suitable shuttle member and suitable devices for moving the same into and out of engagement with the film, and is disclosed in my copending application for Letters Patent of the United States for improvements in an "actuating mechanism for cinematographic film", filed Feb. 13, 1915, Serial No. 7930. The shuttle comprises a suitable member 20, a vertical portion whereof adjacent the film is provided with preferably three laterally disposed teeth, 34, 35 and 36, that have slightly tapered or reduced outer portions and the parallel portions of said teeth substantially correspond in transverse section with the contour of the perforations 6 of the film. The central tooth 35 is substantially the same dimension as the perforations so that it will engage and fit snugly therein, as shown in Fig. 3 of the drawings; while the teeth 34 and 36, on opposite sides thereof, are slightly less in thickness than the length of the perforations and are so disposed in relation to the central tooth 35, that when they are in engagement with the film, they secure a vertical positioning or control of the film. By this peculiar arrangement of the major axes of the perforations, the views on the film are adapted to be brought into closer register with the aperture of the projecting apparatus or camera, or other structure upon which they are used, and, as a result, the longitudinal shrinkage of the film is taken care of and the film is controlled with more precision than would be the case with an ordinary sprocket. It is obvious that a film sprocket would hardly suffice to propel or move the film with any degree of accuracy. The Howell structure permits of the exact registration and alinement of the film with respect to the aperture, because the teeth maintain the vertical disposition of the pictures and through the accurately fitting central tooth, locate the individual scenes or views with respect to the aperture.

As is well known, the development, fixing, washing and drying of film causes a slight shrinkage thereof. The longitudinal displacement caused by this contraction must be taken into account but, while the transverse contraction is just as great in proportion the actual amount thereof is so small as to be negligible and therefore does not interfere with the control of the path of the film through the perforations as above described.

It is obvious that the film may be made as above described containing views the same size as at present used with a distinct economy in the amount of film. The most noticeable economy, however, is secured with film having views of reduced size either in the single or double rows.

It will also be seen that where a film with double rows is employed a succession of pictures may be taken upon one row in one direction and upon the other row in the opposite direction, in which case, the direction of the film need only be reversed for projection without the necessity of rewinding same.

Having described my invention what I claim as new and desire to secure by Letters Patent is:—

1. A cinematograph or motion picture film having a longitudinal path adapted to contain a series of successive views, and a series of perforations upon one edge of said view path, the centers of which aline with a medial line between adjacent views, the major axes of said perforations being disposed longitudinally of said film whereby said film is adapted to coöperate with an actuating element that is provided with two or more projections, one of which projections accurately fitting a perforation in said film, and the remaining projection or projections constructed to position the film transversely with respect to the aperture of the machine.

2. A cinematograph or motion picture film having a longitudinal path adapted to contain a series of successive views, and a series of longitudinally elongated perforations adjacent the edges of the views in said path, the centers of which aline with a medial line between adjacent views, whereby said film is adapted to coöperate with an actuating element that is provided with two or more projections one of which projections accurately fitting a perforation in said film and the remaining projection or projections constructed to position the film transversely with respect to the aperture of the machine.

3. A cinematograph or motion picture film having a longitudinal path adapted to contain a series of successive views, and a series of longitudinally elongated perforations arranged adjacent the edges of the views in said path and disposed longitudinally of said film path so that there are an equal number of views and perforations, whereby said film is adapted to coöperate with an actuating element that is provided with two or more projections one of which projections accurately fitting a perforation in said film and the remaining projection or projections constructed to position the film transversely with respect to the aperture of the machine.

4. A cinematograph or motion picture film having two parallel longitudinal paths, each adapted to contain a series of successive views, and a series of perforations arranged longitudinally of said film and medially of said view paths, the major axes of said perforations being disposed longitudinally of said film whereby said film is adapted to coöperate with an actuating element that is provided with two or more projections, one of which projections accurately fitting a perforation in said film, and the remaining projection or projections constructed to position the film transversely with respect to the aperture of the machine.

5. A cinematograph or motion picture film comprising or having two parallel longitudinal paths, each adapted to contain a series of successive views, and a series of elongated perforations arranged longitudinally and medially of said view paths, the major axes of said perforations being disposed longitudinally of said film whereby said film is adapted to coöperate with an actuating element that is provided with two or more projections, one of which projections accurately fitting a perforation in said film, and the remaining projection or projections constructed to position the film transversely with respect to the aperture of the machine.

6. A cinematograph or motion picture film comprising or having two parallel longitudinal paths, each adapted to contain a series of successive views, and a series of longitudinally elongated perforations arranged longitudinally and medially of said film paths, the center of which perforations aline with a medial line between adjacent successive views, whereby said film is adapted to coöperate with an actuating element that is provided with two or more projections one of which projections accurately fitting a perforation in said film and the remaining projection or projections constructed to position the film transversely with respect to the aperture of the machine.

In testimony whereof I affix my signature in the presence of two witnesses.

ALBERT S. HOWELL.

Witnesses:
LILLIAN HIMMEL,
WM. HAROLD EICHELMAN.